United States Patent [19]

Collado

[11] 4,211,284
[45] Jul. 8, 1980

[54] SUGARCANE CULTIVATOR

[76] Inventor: Hugo Collado, 502 Cypress La., Palm Springs, Fla. 33461

[21] Appl. No.: 902,035

[22] Filed: May 2, 1978

Related U.S. Application Data

[63] Continuation-in-part of Ser. No. 791,722, Apr. 28, 1977, abandoned.

[51] Int. Cl.$^2$ .............................................. A01B 39/08
[52] U.S. Cl. .................................... 172/151; 172/185; 172/187; 172/567
[58] Field of Search ................ 172/148, 149, 151, 184, 172/187, 584, 595, 594, 596, 586, 578, 587, 567, 602, 185, 600, 603, 583

[56] References Cited

U.S. PATENT DOCUMENTS

| | | | |
|---|---|---|---|
| 590,191 | 9/1897 | Holsclaw | 172/583 |
| 623,677 | 4/1899 | Kouns | 172/567 |
| 1,762,844 | 6/1930 | Towner | 172/596 |
| 2,344,301 | 3/1944 | Hand | 172/185 |
| 2,592,987 | 4/1952 | White | 172/596 |
| 2,708,333 | 5/1955 | Cooney | 172/595 X |
| 2,880,813 | 4/1959 | Wiseman | 172/187 X |
| 3,014,541 | 12/1961 | Oehler | 172/596 |
| 3,080,933 | 3/1963 | Kramer | 172/594 |
| 3,107,737 | 10/1963 | Van Sickle | 172/596 |

Primary Examiner—Richard J. Johnson
Attorney, Agent, or Firm—Craig E. Larson

[57] ABSTRACT

An improved earth working implement is disclosed which is particularly suitable for surgarcane cultivation, said implement having four main pluralities of saucer shaped cultivator discs carried by a trailer, each of said pluralities being individually adjustable to vary the angular relationship of the discs relative to the longitudinal axis of the trailer as well as the lateral spacing between the discs and said axis. A pair of retractable wheels are provided to permit the trailer to be towed between a storage area and the sugarcane fields. An adjustable soil deflector disc is disposed adjacent to and rearwardly of each plurality of discs to deflect the soil removed by the cultivator discs in a loosened condition back into the general area from which it was removed. Two additional pairs of cultivator discs are rotatably, angularly, adjustably attachable to the rear end of the trailer. In addition, an elongated beam may be transversely attached to the trailer with additional pluralities of rotatably angularly adjustable cultivator discs attached thereto to expand the one pass range of the cultivator from a normal three rows to five rows. Rakes may also be attached to the trailer and beam to remove surface debris from the immediate area of the cane rows.

25 Claims, 4 Drawing Figures

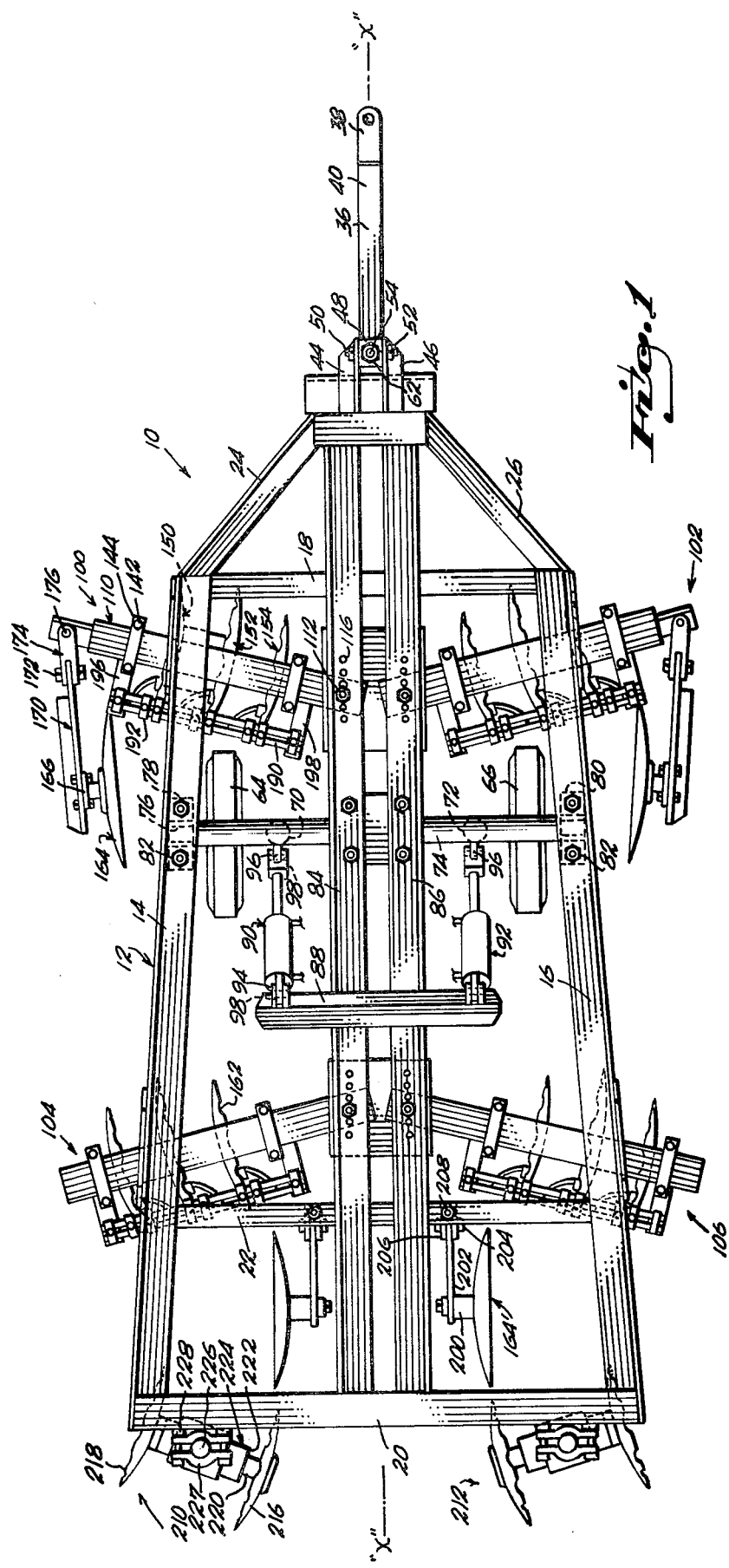

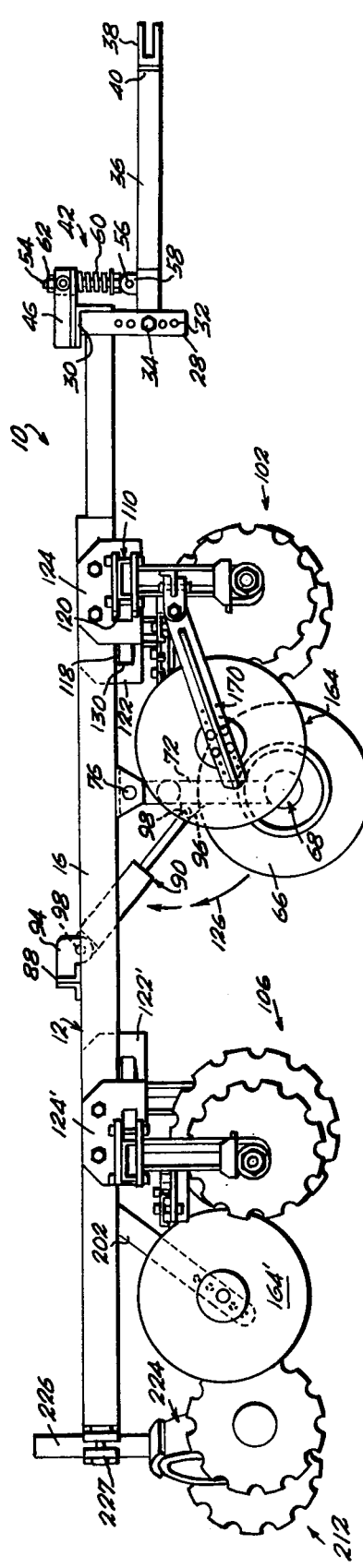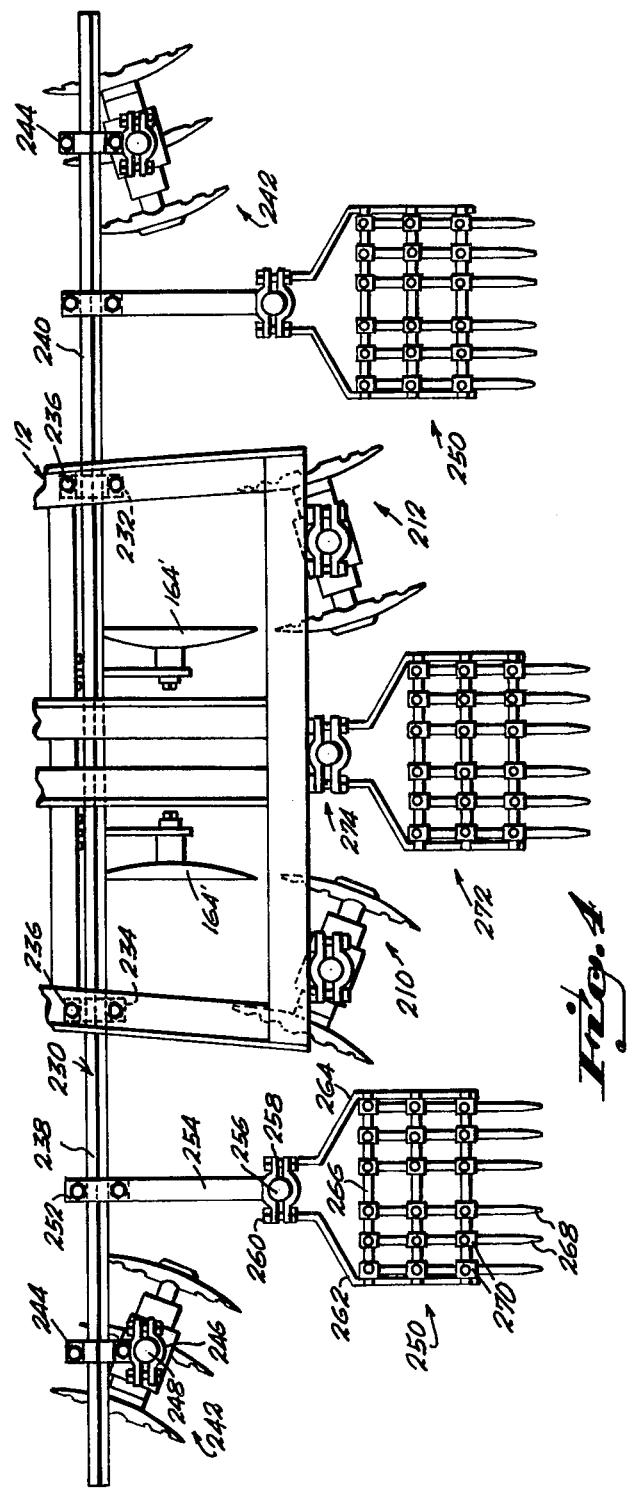

SUGARCANE CULTIVATOR

CROSS REFERENCE TO RELATED APPLICATION

This application is a continuation-in-part of application Ser. No. 791,722, filed Apr. 28, 1977, now abandoned.

BACKGROUND OF THE INVENTION

1. Field of the Invention

This invention relates to earth working implements useful for physically treating the earth and more particularly to row-crop cultivating implements having a plurality of earth working elements in tandem and double tandem relationship, said elements having a rotating or orbital motion due to the resistance of the earth to movement of the elements thereover. This invention further relates to cultivating implements wherein the rolling or rotating earth working element is a generally circular, plate-like member and there are a plurality of groups or clusters of said members, each group or cluster comprising a subassembly of parts which is handled as a unit. This invention still further relates to means, used in conjunction with an earth working element of a cultivator disc subassembly, for limiting the lateral movement of material thrown out by the disc earth working elements, said means also having a rotating movement imparted thereto by rolling contact with the ground.

2. Description of the Prior Art

Disc earth working implements having forward and rear pairs of disc gangs which are angularly adjustable relative to the longitudinal axis of the implement for varying the cultivation pattern are generally known. They employ as earth working elements generally concave-shaped disc bodies which serve to produce furrows in the ground during operation. By varying the angular relationship between the respective pairs of forward and rear disc clusters or gangs, the ground area disced and the width and depth of each furrow can be controlled. The forward disc clusters are usually supported so that the concave surfaces of the disc blades are directed outwardly from the longitudinal axis of the implement with a resulting movement of dirt outwardly from the longitudinal axis of the implement during operation. The rear disc clusters are usually supported so that the concave surfaces of the disc blades are directed inwardly toward the longitudinal axis of the implement with a resulting movement of dirt inwardly toward the longitudinal axis of the implement during operation. The net effect of this arrangement is to shift the soil to and fro and to reduce the tendency of the implement to drift sidewise during operation.

Such earth working implements have been employed for a variety of agricultural purposes such as harrowing and plowing open fields and cultivating row crops. The use dictates the physical treatment of the soil needed and hence the design of the implement. For example, when used for cultivating row crops, the implement will often have a means to limit the lateral movement of earth thrown out by the respective disc clusters to protect adjacent rows of plants. See U.S. Pat. Nos. 1,117,728 (shows rotating "fender discs" associated with cultivator disc assemblies) and 2,635,520 (shows "dirt boards" associated with cultivator disc assemblies). However, the need for and the extent of "shielding" provided by such means is further governed by the specific row crop to be cultivated by the implement. Soybeans and beets require extensive shielding. Corn does not require shielding and in fact could be damaged if such shielding were provided.

Cultivation is a multipurpose agricultural operation broadly concerned with conditioning the soil to improve water retention characteristics, with weed control, and with conditioning the soil to maximize the yield of the row crop being cultivated. An example of the latter purpose is "hilling" of corn, referred to above.

The cultivation of sugar cane has peculiar needs with which the present invention is concerned. The roots of the sugar cane plant are very slender and almost cylindrical. The roots are seldom more than a foot in length and have a few short fibers at their extremities. Exposure of these roots to the atmosphere is fatal to the plant. However, equally undesirable is excessive build up of soil on or near the plants during cultivation. Present cultivator apparatus used by sugar-cane growers are usually of the driven, roto-tiller type. This type of machine is plagued by high maintenance costs. The lack of success of present cultivation methods and apparatus is further apparent from the recent development of so-caled "minimal cultivation" methods in the sugar cane industry as a result of the discovery that cultivation—an operation intended to increase cane production—often has the opposite effect, particularly when the cane is cultivated periodically through the growing season.

Accordingly, a principal object of the present invention is to provide a sugarcane cultivator of the disc type, the use of which will have the desired result of maximizing cane production.

Another object of this invention is to provide an earth working implement for hitched attachment to a tow vehicle, the implement comprising a trailer with retractable wheels for transportation, with at least six pluralities of adjustable cultivator disc assemblies arranged in double tandem relationship to one another, and an adjustable soil deflector disc associated with the two forward pairs of adjustable cultivator disc assemblies.

Another object of the present invention is to provide means to permit individual adjustment of the angular relationship of each plurality of cultivator discs and associated deflector disc relative to the longitudinal axis of the trailer as well as means to permit individual adjustment of the lateral spacing between each plurality of cultivator discs and associated deflector disc relative to said longitudinal axis.

A further object of the invention is to provide means to permit the angular and vertical adjustment of each deflector disc relative to its associated plurality of cultivator discs.

A still further object of the invention is to provide an earth working implement with exceptional directional stability.

Yet another object of the invention is to provide means to permit the attachment of additional pluralities of adjustable cultivator discs as well as rakes to the trailer.

SUMMARY OF THE INVENTION

The present invention resides in the discovery of a highly efficient apparatus for the cultivation of sugarcane. The apparatus is simple and relatively maintenance-free. Although developed in the context of sugarcane growing, the apparatus represents an advance in cultivator design which may advantageously be applied to other growing crops and its designation as a "sugarcane cultivator" is not meant to be limiting but only to indicate the source of its development and the agricultural purposes for which it may be employed.

Briefly, it has been discovered that improved cultivation of sugarcane may be attained by successively passing three groups or clusters of disc-type earth working elements along the ground between rows of growing crops. This arrangement has been found to have weed control and soil conditioning characteristics superior to those attained where only two or less groups or clusters of earth working elements are successively passed along the row. As the first cluster of discs passes, weeds are moved to the side and some weed roots are severed, but, if left in that state, substantial weed growth would continue. As the second cluster of discs passes, the weeds are killed and nearly all of the roots are severed, but the weeds remain at or near the surface of the soil and substantial weed growth would resume within a relatively short period of time. As the third cluster of discs passes, the weeds are "turned" into the subsurface and the ground is returned to a relatively level state so that channeling of water is minimized and water retention is improved. Since the weeds are "turned into" the subsurface, substantial weed growth continues only after a relatively longer period of time and the vegetable matter is "mulched" into the soil.

Soil deflector discs are provided adjacent to the first two clusters of discs, as hereinafter described in more detail, to protect the growing crop and to aid the desirable "rolling" motion of the soil. The discs are adjustable relative to the longitudinal axis of the implement and relative to the cluster of discs, thus allowing maximum flexibility in adapting the implement to the particular field conditions encountered.

Unlike most prior art rotating earth working implements, the implement of the present invention is supported by enlarged diameter spacer drums placed between individual earth working elements of the respective disc clusters. This is superior to prior art disc-depth controlling devices such as wheels or "skis" for the reason that soil compaction is minimized.

A further improvement of the cultivating implement of the present invention resides in the discovery that the directional stability of the towed implement is markedly improved by employing a disc cluster subassembly wherein a central earth working element of the subassembly has a diameter larger than that of the other elements. Preferably, the ratio of the diameter of the larger disc to those of the smaller discs is within the range from about 1.0:1 to about 1.2:1, and more preferably the ratio is about 1.1:1.

The use of a disc cluster subassembly wherein a central earth working element of the subassembly has a diameter larger than that of the other elements has further surprising and useful advantages when the soil surface around the row crop being cultivated is covered by a layer of straw and/or leaves—a condition not uncommon in sugarcane fields. The implements presently used for sugarcane cultivation tend to "ride on top" of such a covering, which reduces the directional stability of the implement and reduces the extent of soil conditioning achieved. However, when the cultivator of this invention is employed under such conditions and particularly when the discs have serrated edges, improved cultivator performance is attained. The larger-diameter, central earth working element cuts through the covering and, together with the other earth working elements, mulches the covering into the subsurface of the soil. When earth working elements having serrated edges are employed in a subassembly wherein all of the elements have the same diameter, the elements cut through the covering, but only minimal "mulching" occurs.

Other objects and improvements of the present invention will be apparent from the following detailed description of the invention and its preferred embodiments.

BRIEF DESCRIPTION OF THE DRAWINGS

FIG. 1 is a top plan view of the sugarcane cultivator of the present invention.

FIG. 2 is a side elevational view of the sugarcane cultivator.

FIG. 4 is a rear end elevation of the sugarcane cultivator with an elevated transverse beam attached thereto carrying additional pluralities of cultivator discs and rakes.

DETAILED DESCRIPTION OF THE INVENTION

Figure 3:
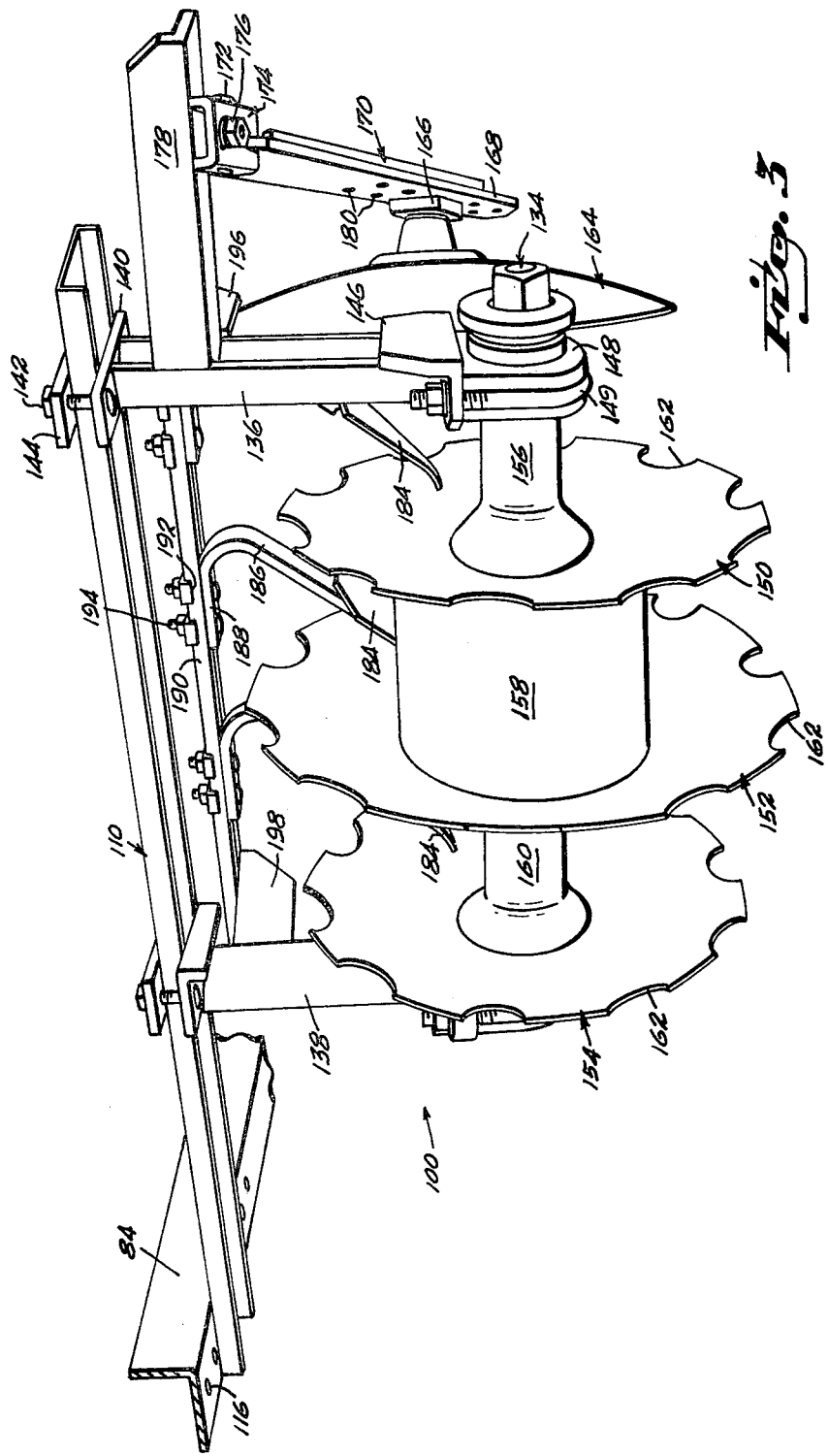
FIG. 3 is an enlarged perspective view of one front plurality of adjustable cultivator discs and its associated adjustable deflector disc and scraper blades.

A cultivator is an earth working implement for loosening the earth and destroying weeds around growing plants. A disc cultivator is a cultivator wherein the earth working elements are generally concave-shaped disc bodies which produce furrows in the ground during operation. A disc cultivator generally comprises a trailer, hitching means for connecting the trailer with a towing vehicle, a retractable wheel assembly, and one or more pluralities of cultivator disc assemblies which may be individually angularly adjustable relative to the longitudinal axis of the implement.

Referring now to the drawings and particularly to FIGS. 1 and 2, a preferred embodiment of the present invention will be described. The cultivator of the present invention is designated generally at 10 in the form of a trailer 12 comprised of opposed, somewhat rearwardly diverging side rails 14 and 16 connected at their respective front and rear ends by front and rear transverse rails 18 and 20 and an intermediate transverse rail 22. A pair of forwardly converging front rails 24 and 26 are connected between the forward ends of side rails 14 and 16 and a pair of vertical side members, one shown at 28, which are interconnected at their top ends by a transverse angle member 30. Vertical members 28 include pluralities of vertically spaced apart, aligned holes 32 for selective through passage of a bolt 34 which also engages through the rear end of a trailer tongue 36. A hitch means 38 of any conventional type is attached to the forward end 40 of tongue 36 for connection to a tow vehicle (not shown).

Resilient leveling means 42 connect between the trailer frame and tongue 36. A pair of spaced apart forwardly extending angle members 44, 46 are fixed to transverse front member 30 and a block 48 is pivoted on cross bolts 50 and 52 extending through the respective forward ends of members 44, 46. A vertical bolt 54 extending centrally through block 48 is pivoted at 56 at its lower end between a pair of upwardly extending ears 58, fixed to the top of tongue 36. Compression spring 60 is circumposed about bolt 54 between ears 56 and the underside of block 48 and a nut 62 threaded on the top end of bolt 54 above block 48 provides means to resiliently adjust the level of the trailer 12 relative to the terrain therebelow. Note that the leveling means is separate from the hitching means and is located between the trailer and the tongue. Although the leveling means may be associated with the hitching means by apparatus known in the art, the presently shown embodiment is preferred thereto.

With further reference to FIGS. 1 and 2, a pair of retractable wheels 64 and 66 are rotatably mounted on a conventional transverse axle assembly 68. Wheels 64 and 66 are of the conventional type, including pneumatic tires, used for over-the-road travel and are located on trailer 12 in a generally central location along its length. Axle assembly 68 is fixed to respective side struts 70, 72 which are in turn fixed to transverse member 74 connected to side journal pins 76 rotatably carried by respective bearing blocks 78, 80, bolted at 82 to the undersides of rails 14 and 16. A pair of parallel spaced apart central angle rails 84, 86 extend the length of the trailer 12 in a welded relation thereto and a central transverse cylinder anchor rail assembly 88 is fixed as by welding thereacross. A pair of pneumatic cylinder and piston assemblies 90 and 92 are pivotally connected between anchor rail assembly 88 and the respective struts 70 and 72 by means of ears 94 and 96, and respective pivot pins 98. The source of supply for the compressed air and the control means are located on the tow vehicle. When cultivating row crops, the wheels of the cultivator of this invention are preferably retracted so that they do not contact the ground. However, cultivators wherein the wheels are used as a means for controlling the depth that the cultivator discs sink into the ground are also within the general scope of this invention.

With particular reference to FIG. 1, there are four main cultivator disc assemblies, a forward pair of assemblies indicated generally at 100 and 102 and a rearward pair 104 and 106. All four disc assemblies 100 through 106 are alike in all respects with one exception, which will hereinafter be described, and will therefore be substantially described relative to the forward disc assembly 100 as detailed in FIG. 3 in combination with FIGS. 1 and 2.

A pivot beam 110 is selectively pivotally bolted at 112 at its inner end in any one of a plurality of aligned holes 116 in each central angle rail 84 and 86 and extends outwardly through slots 118 and 120 in brackets 122 and 124 fixed respectively to rails 84, 14 and 86, 16. The inner end of the forward pivot beams 110 may also have a plurality of centrally aligned holes for adjusting the main cultivator disc assemblies to the width of the cane row (not shown). The slots 118 and 120 are best illustrated in FIG. 2 relative to cultivator disc assembly 102. As illustrated in FIG. 2 the brackets 122, 124 with their respective slots 118, 120 are bolted respectively to rails 86, 16 and are transversely misaligned in a manner so as to position the pivot beam 110 in a generally outwardly forwardly angular relationship to the longitudinal axis "X"—"X" of trailer 12, the degree of the angular relationship being determined by the selected hole 116 for the pivotal connection 112. The slots 118 and 120 are somewhat longer than the width of pivot beam 110 to accommodate the range of angular adjustment provided by holes 116. In the cultivating operation, the wheels 64, 66 are retracted as indicated by arrows 126, FIG. 2, and the four main disc assemblies 100 through 106 will bite into the soil. It should be noted that with the trailer 12 being pulled forwardly, the rear edge 130 of each outer bracket slot 120 will determine the actual aforementioned angular relationship because of the drag resistance against the cultivating discs by their engagement in the soil and by the fact that the pivot 112 forms the only attachment of beam 110 to trailer 12.

An axle assembly 134 is suspended beneath each pivot beam 110 as seen in FIG. 3 by means of outer and inner vertical suspension beams 136, 138, fixed in an adjustable clamped relation to beam 110. Each vertical beam 136 and 138 is welded to a top plate 140 and beam 110 is clamped by bolts 142 between top plate 140 and an upper strap 144. An angle member 146 and a grooved bearing block 148 are fixed as by welding and U-bolts 149 to the lower ends of the respective channels 136 and 138 to journal axle assembly 134. Three outwardly opening saucer shaped discs 150, 152 and 154 are fixed to axle assembly 134 in a spaced apart relation by spacers 156, 158 and 160. Center spacer 158 is of a substantially enlarged diameter relative to spacers 158, 160 to determine the depth to which the discs bite into the soil. The center disc 152 is of a somewhat enlarged diameter and the peripheral edges of all three discs 150, 152 and 154 may be provided with serrations such as 162.

An inwardly opening saucer shaped soil deflector disc 164 is rotatably fixed in a bearing block 166 to an outer end 168 of an arm 170, adjustably, vertically, pivotally attached at 172 at its upper end in a clevis 174 which is adjustably, horizontally, pivotally attached at 176 to an outward extension 178, fixed as by welding to outer beam 136.

The outwardly opening discs 156, 158 and 160, while in use, turn the soil over and outwardly in a continuous wave-like form and the deflector disc 164 moves the soil in a broken-up loose condition back inwardly to a substantial degree. Pluralities of spaced apart holes 180, FIG. 3, may be provided in each deflector disc arm 170 to permit adjustable positioning of bearing block 166 therealong. Generally, when the soil is harder, the deflector disc should be placed further back on the deflector disc arm 170.

Adjustable scraper blades 184 fixed as by welding to the lower ends of appropriately formed arms 186 are positioned to remove soil deposits which tend to build up on the concave outer surfaces of discs 150, 152 and 154. Upper ends of arms 186 are turned as at 188 to lie across the bottom surfaces of a pair of spaced apart parallel bars 190, and are locked in place by U-clamps 192 and nuts and bolts 194 as seen in FIGS. 1 and 3. Parallel bars 190 are fixed in a spanning relation to a pair of angle arms 196, 198 fixed to and extending forwardly from the respective vertical suspension beams 136 and 138.

The pair of forward disc assemblies 100 and 102 are similar in every detail and are disposed in a spaced-apart, oppositely, outwardly, forwardly-angled relation. Back disc assemblies 104 and 106 are similar to assemblies 100, 102, however, the slotted brackets 122' and 124' are misaligned in a manner so as to adjustably position said disc assemblies 104, 106 in an oppositely, outwardly, rearwardly angled relation to each other and to axis "X"—"X". Disc assemblies 104 and 106 differ from disc assemblies 100, 102 only insofar as each soil deflector disc 164' is separately mounted on the intermediate transverse trailer rail 22. Each disc 164' is rotatably mounted at 200 to the distal end portion of an arm 202, which is adjustably pivotally bolted at its upper end at 204 to a clevis 206 which is adjustably pivotally bolted at 208 to transverse rail 22. Further-more, the concavity of the main discs are inwardly facing and the concavity of the associated soil deflector discs are outwardly facing, thus reversing the rolling motion of the soil produced by the forward pair of main cultivator disc assemblies.

Two additional assemblies of saucer shaped cultivator discs 210 and 212 are attached to the rear end rail 20 of trailer 12. Each assembly such as 210 is comprised of two or three discs (two are preferred as illustrated at 216, 218) fixed to a shaft 220, rotatably journaled in the lower arm ends 222 of a yoke member 224. A vertically extending shaft 226 fixed to the top of yoke member 224 is adjustably rotatably clamped at 227 to end rail 20, said clamp 227 being fixed at 228 to the rail 20. As noted in the Summary, supra, the function of the rear additional cultivator disc assemblies is to turn the severed weeds into the ground and to level the ground surface.

With reference to FIG. 4, an elongated bar 230, preferably of a generally rectangular cross sectional configuration is clamped generally at its midsection transversely across the trailer 12. Clamp means 232, 234, fixed relative to the underside of the trailer side rails 14 and 16 are engaged with bar 230 by bolts 236. A variety of cultivator assemblies may be adjustably clamped along the extended end portions 238, 240 of bar 230.

FIG. 4 illustrates a cultivator disc assembly 242 clamped at 244 adjacent each end of bar 230. Each disc assembly is similar to disc assemblies 210 and 212 (except that a central earth working element need not be of an enlarged diameter) and needs no further description with the exception of a clamp 246, fixed to each clamp 244 to adjustably rotatably support a disc assembly shaft 248.

Inboard of each disc assembly 242 a rake assembly 250 is adjustably slidably clamped at 252 to bar 230. The rake structure forms no part of the present invention but each rake assembly is comprised generally of a rearwardly extending bar 254 from clamp 252 with a vertically extending stud 256 fixed to its extended end. A clamp means 258, adjustably bolted at 260 to stud 256, carries a pair of side frame members 262, 264 spanned by a plurality of transverse bars 266. A plurality of rearwardly downwardly extending spring fingers 268 are adjustably clamped at 270 to each cross bar 266. A third, central rake assembly 272 of like structure may be pivotally clamped at 274 to the rear trailer rail 20.

In use, the cultivator disc assemblies 100, 102, 104, 106, 210 and 212 will cultivate three rows of sugarcane, a central row along axis "X"—"X" and side rows outwardly of the main disc assemblies, the positioning of the rake assemblies in FIG. 4 generally define the three row positions. The pair of outboard disc assemblies 242, carried by bar 230 serve to cultivate fourth and fifth sugarcane rows when in use.

What is claimed is:

1. In a row crop cultivator having a trailer, a hitching means for connecting the trailer with a towing vehicle, a retractable wheel assembly, and one or more pluralities of cultivator disc assemblies which are individually angularly adjustable relative to the longitudinal axis of the cultivator, the improvement which comprises: arranging three pairs of cultivator disc assemblies on the trailer in tandem relationship to each other, each of the forward four pluralities of cultivator disc assemblies having a central earth working element of larger diameter than the other disc earth working elements of the cultivator disc assembly and each of the forward four pluralities of cultivator disc assemblies having a deflector disc positioned somewhat rearwardly therefrom; positioning the disc earth working elements of the successive tandemly arranged cultivator disc assemblies so that said elements have an alternating inwardly- and outwardly-opening saucer configuration; and positioning the deflector disc so that its saucer configuration alternates with the associated cultivator disc assembly.

2. The apparatus of claim 1 wherein each of said forward four pluralities of cultivator disc assemblies comprises three discs rotatably carried on an axle and including spacer means disposed on said axle between each of said three discs and further wherein each of the rear two pluralities of cultivator disc assemblies comprise two discs rotatably carried on an axle.

3. The apparatus of claim 2 wherein said spacer means comprise drums and wherein the spacer drums between the outer discs of the two forward most pluralities of cultivator disc assemblies are of enlarged diameter and comprise the means for controlling the depth to which the disc earth working elements sink into the soil when the trailer wheels are fully retracted.

4. The apparatus of claim 3 wherein a resilient leveling means is connected between the trailer and the hitching means.

5. The apparatus of claim 1 wherein the disc elements of the forwardmost pair of cultivator disc assemblies have an outwardly-opening saucer configuration, the deflector discs associated with said forwardmost pair of cultivator disc assemblies have an inwardly-opening saucer configuration, the disc elements of the middle pair of cultivator disc assemblies have an inwardly-opening saucer configuration, the deflector discs associated with said middle pair of cultivator disc assemblies have an outwardly-opening saucer configuration, and the disc elements of the rear pair of cultivator disc assemblies have an outwardly-opening saucer configuration.

6. A sugarcane cultivator comprising:
  a. a trailer having a main longitudinal axis and including a main frame comprised of a pair of side rails, front and rear rail means connecting between said side rails, a tongue including a hitch means pivotally connected to said front rail means, central longitudinally extending rail means fixed between said front and rear rail means, and retractable wheel means fixed relative to said main frame;
  b. a plurality of main cultivator disc assemblies in double tandem relationship to one another including a pair of forward disc assemblies disposed on respective sides of said axis and a pair of rearward disc assemblies disposed on respective sides of said axis, each of said forward and rearward disc assemblies including a main pivot beam disposed for pivotal movement in a generally horizontal plane and means to pivotally adjust each of said pivot beams within a predetermined range of generally outwardly extending angular positions relative to said axis, a plurality of cultivator discs rotatably suspended beneath each of said pivot beams for adjustable movement therewith and means to adjust said plurality of cultivator discs longitudinally of said pivot beam;
  c. deflector discs fixed somewhat rearwardly of each forward and rearward plurality of cultivator discs and meas to mount and adjust said deflector disc relative to said cultivator discs; and
  d. a pair of trailing cultivator disc assemblies in tandem relationship to said main cultivator disc assemblies vertically adjustably connected to said rear rail means on respective sides of said axis, clamp means for attachment of each of said trailing disc assemblies to said rear rail means, each of said trailing disc assemblies being comprised of at least two cultivating discs fixed to an axle, a yoke member defining a pair of downwardly extending arms with said axle being journaled through said arms, said yoke including an upwardly extending shaft for selective vertical and rotational positioning in a fixed engagement by said clamp means.

7. The sugarcane cultivator as defined in claim 6 wherein each of said forward and rearward pluralities of cultivator discs comprises three discs rotatably carried on an axle and including spacer means disposed on said axle between each of said three discs and further wherein the middle disc of each of said forward and rearward pluralities is of enlarged diameter.

8. The apparatus of claim 7 wherein the ratio of the diameter of the larger, middle disc to the diameter of the smaller discs of the plurality of cultivator discs is within the range from about 1.0:1 to about 1.2:1.

9. The apparatus of claim 8 wherein said ratio is about 1.1:1.

10. The apparatus of claim 9 wherein the diameter of the larger, middle disc is about 22 inches.

11. The apparatus of claim 7 wherein said spacer means comprise drums and wherein the spacer drums between the outer discs of each of said forward pluralities of cultivator discs are of enlarged diameter and comprise the means for controlling the depth to which the cultivator discs sink into the soil.

12. The sugarcane cultivator as defined in claim 7 including a bearing means engaging each end of said axle and outer and inner vertically extending suspension members fixed at bottom ends to the respective end bearing means and at top ends to said pivot beam.

13. The sugarcane cultivator as defined in claim 12 wherein said means to adjust said cultivator discs longitudinally of said pivot beam comprises a clamp rigidly fixed to the top end of each of said outer and inner suspension member and means such as nuts and bolts for selective adjustable attachment of said clamp along the length of said pivot beam.

14. The sugarcane cultivator as defined in claim 13 wherein said means to mount and adjust said forward deflector disc comprises an outward extension from each of said outer vertically extending suspension members of each of said forward disc assemblies, a generally rearwardly extending arm and a yoke member, said yoke being pivotally attached to said outward extension for movement in a generally horizontal plane and said arm being pivotally attached at a first end to said yoke for movement in a generally vertical plane, and one of said deflector discs being rotatably carried on a second end of said rearwardly extending arm, said deflector disc being of a generally inwardly opening saucer configuration.

15. The sugarcane cultivator as defined in claim 6 including a pair of spaced apart fixed vertical members comprising the front end of said front rail means, said pair of vertical members including pluralities of aligned pairs of spaced apart holes, and said pivotal tongue connection to said front rail means comprising a removable pivot means such as a nut and bolt for selective connection through any pair of said aligned holes and said tongue to adjust the height of said tongue relative to said main trailer frame.

16. The sugarcane cultivator as defined in claim 15 including resilient leveling means connecting between said tongue and said front rail means.

17. The sugarcane cultivator as defined in claim 16 wherein said resilient leveling means comprises a forward extension from said fixed vertical members, a block providing a central vertical screw-threaded hole pivotally connected to said extension, a bolt, pivotally connected to said tongue and threaded through said hole and extending thereabove, a compression spring circumposed about said bolt between said block and said pivotal connection to said tongue and a nut threaded on said thereabove bolt extension.

18. A sugarcane cultivator as defined in claim 6 wherein each disc of said forward disc assemblies is of an outwardly-opening saucer configuration and including serrated peripheral edges thereon.

19. A sugarcane cultivator as defined in claim 18 wherein each disc of said rearward disc assemblies is of an inwardly-opening saucer configuration and including serrated peripheral edges thereon.

20. A sugarcane cultivator as defined in claim 16 wherein each disc of said trailing cultivator disc assemblies is of an outwardly-opening saucer configuration and including serrated peripheral edges thereon.

21. A sugarcane cultivator as defined in claim 6 wherein each of said pivot beams includes inner and outer end portions and is of a predetermined width, and said means to adjust each of said pivot beams includes a plurality of spaced apart longitudinally disposed holes in said centeral longitudinal rail means for each of said pivot beams and fastening means engaged through said inner end portion and a selected hole of said plurality of holes.

22. A sugarcane cultivator as defined in claim 21 wherein said means to adjust each of said pivot beam includes a pair of vertically extending brackets fixed respectively to one of said side rails and said central longitudinal rail means, and transversely misaligned slots in each of said brackets to slidably receive said pivot beam therethrough, each slot being of a predetermined longer length than said pivot beam width.

23. The sugarcane cultivator as defined in claim 6 including an intermediate transverse rail, fixed between said trailer side rails somewhat rearwardly of said pair of rearward disc assemblies, and a generally rearwardly extending arm, comprising said means to mount and adjust, pivotally attach at its forward end to said intermediate rail somewhat inwardly of each of said pair of rearward disc assemblies and one of said deflector discs being rotatably fixed to the rearward end of each of said rearwardly extending arm, said disc being of a generally outwardly opening saucer configuration.

24. The sugarcane cultivator as defined in claim 6 including an elongated transverse bar removably centrally fixed across said main frame providing substantial oppositely outwardly extending lengths beyond both of said side rails and including at least one cultivator disc assembly adjustably fixed to each of said outwardly extending lengths.

25. The sugarcane cultivator as defined in claim 6 including at least one rake means adjustably fixed to each of said outwardly extending lengths.

* * * * *